(12) United States Patent
Lin

(10) Patent No.: US 11,856,595 B2
(45) Date of Patent: Dec. 26, 2023

(54) WIRELESS COMMUNICATION METHOD AND APPARATUS

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 161 days.

(21) Appl. No.: 17/515,220

(22) Filed: Oct. 29, 2021

(65) Prior Publication Data

US 2022/0053497 A1 Feb. 17, 2022

Related U.S. Application Data

(63) Continuation of application No. 16/614,065, filed as application No. PCT/CN2017/087450 on Jun. 7, 2017, now Pat. No. 11,191,079.

(51) Int. Cl.
 *H04W 72/04* (2023.01)
 *H04W 72/02* (2009.01)
 *H04W 72/53* (2023.01)
 *H04W 72/0446* (2023.01)
 *H04W 72/0453* (2023.01)

(52) U.S. Cl.
 CPC ........... *H04W 72/53* (2023.01); *H04W 72/02* (2013.01); *H04W 72/0446* (2013.01); *H04W 72/0453* (2013.01)

(58) Field of Classification Search
 CPC . H04W 72/53; H04W 72/02; H04W 72/0446; H04W 72/0453
 See application file for complete search history.

(56) References Cited

U.S. PATENT DOCUMENTS

2021/0068098 A1* 3/2021 Wang .................... H04L 5/0053

FOREIGN PATENT DOCUMENTS

EP 3589058 1/2020

OTHER PUBLICATIONS

R1-1707396, 'Time and frequency domain resource allocation for long PUCCH', Intel Corp, 3GPP TSG RAN WG1 Meeting #89, May 15-19, 2017, pp. 1-5. (Year: 2017).*
EPO, Communication for EP Application No. 17912696.6, dated Nov. 22, 2021.
KIPO, Office Action for KR 10-2019-7035827, dated Jun. 8, 2022.
ILPO, Office Action for IL 270884, dated Apr. 26, 2022.
IP Indonesia, Office Action for ID P-00202000120, dated May 23, 2022.

(Continued)

*Primary Examiner* — Melvin C Marcelo
(74) *Attorney, Agent, or Firm* — Hodgson Russ LLP

(57) ABSTRACT

Provided in implementation of the present disclosure are a wireless communication method and device, configured to improve flexibility of channel transmission. The method includes: determining, by a terminal device, a plurality of time units according to a constraint condition starting from a first time unit, the plurality of time units being used for transmitting one first channel; and sending, by the terminal device, the one first channel to a network device on the plurality of time units.

18 Claims, 4 Drawing Sheets

(56) References Cited

OTHER PUBLICATIONS

IMPI, Office Action for MX Application No. MX/a/2019/014725, dated Jan. 23, 2023.
EPO, Communication for EP Application No. 17912696.6, dated Apr. 29, 2022.
APO, Office Action for AU Application No. 2017417241, dated Apr. 20, 2022.
KIPO, Office Action for KR Application No. 10-2019-7035827, dated Mar. 30, 2022.
JPO, Office Action for JP Application No. 2019-566636, dated Mar. 11, 2022.
INAPI, Office Action for CL Application No. 201903525, dated Feb. 14, 2022.
Huawei et al., "Long-duration PUCCH design," 3GPP TSG RAN WG1 Meeting #88bis, R1-1704208, Apr. 2017.
EPO, Extended European Search Report for EP Application No. 23161759.8, dated May 9, 2023.
IMPI, Office Action for MX Application No. MX/a/2019/014725, dated Apr. 10, 2023.

\* cited by examiner

WIRELESS COMMUNICATION METHOD AND APPARATUS

CROSS-REFERENCE TO RELATED APPLICATION

This application is a continuation of U.S. application Ser. No. 16/614,065, filed Nov. 15, 2019, which is a U.S. National Stage Entry of International Application No. PCT/CN2017/087450, filed Jun. 7, 2017, the entire disclosures of which are incorporated herein by reference.

TECHNICAL FIELD

The present disclosure relates to the field of communications and, more particularly, to a wireless communication method and device.

BACKGROUND

In the current New Radio (NR) system, the flexibility of channel transmission is required to be high. For example, due to the limitation of the current transmission power of the terminal device, more flexible channel transmission is expected.

Therefore, how to enhance the flexibility of channel transmission is an urgent problem to be solved.

SUMMARY

The implementation of the present disclosure provides a wireless communication method and device.

In a first aspect, there is provided a wireless communication method, including:
  determining, by a terminal device, a plurality of time units according to a constraint condition starting from a first time unit, the plurality of time units being used for transmitting one first channel; and
  sending, by the terminal device, the one first channel to a network device on the plurality of time units.

In combination with the first aspect, in a possible implementation of the first aspect, the constraint condition is a constraint on at least one of followings of the time unit: a physical resource available for transmitting the one first channel within the time unit, or a channel transmitted in the time unit other than the one first channel.

In combination with the first aspect or any of the above possible implementations, in another possible implementation of the first aspect, the constraint on the physical resource available for transmitting the one first channel within the time unit includes: a constraint on the number of the physical resource available for transmitting the one first channel within the time unit.

In combination with the first aspect or any of the above possible implementations, in another possible implementation of the first aspect, the number of a physical resource available for transmitting the first channel in each of the time units satisfying the constraint condition is greater than or equal to a predetermined value.

In combination with the first aspect or any of the above possible implementations, in another possible implementation of the first aspect, the method includes:
  the number of time domain symbols available for transmitting the one first channel within each of the time units satisfying the constraint condition being greater than or equal to a first predetermined value; or
  the number of time domain symbols available for transmitting the one first channel within each of the time units satisfying the constraint condition being greater than or equal to a first predetermined value, and the number of frequency domain resources available for transmitting the one first channel being greater than or equal to a second predetermined value; or
  the number of a first channel unit available for transmission within each of the time units satisfying the constraint condition being greater than or equal to a third predetermined value.

In combination with the first aspect or any of the above possible implementations, in another possible implementation of the first aspect, the first channel unit includes a reference signal and comprises control and/or data information.

In combination with the first aspect or any of the above possible implementations, in another possible implementation of the first aspect, the method further includes:
  receiving, by the terminal device, first configuration information sent by the network device, the first configuration information being used to configure the first channel unit.

In combination with the first aspect or any of the above possible implementations, in another possible implementation of the first aspect, the method further includes:
  receiving, by the terminal device, second configuration information sent by the network device, the second configuration information being used for indicating the predetermined value.

In combination with the first aspect or any of the above possible implementations, in another possible implementation of the first aspect, the constraint on the channel transmitted in the time unit other than the one first channel includes: a constraint on a priority of the channel transmitted in the time unit other than the one first channel with respect to the one first channel.

In combination with the first aspect or any of the above possible implementations, in another possible implementation of the first aspect, the channel transmitted in the time unit satisfying the constraint condition other than the one first channel has a lower priority than that of the one first channel.

In combination with the first aspect or any of the above possible implementations, in another possible implementation of the first aspect, the determining, by the terminal device, the plurality of time units according to the constraint condition starting from the first time unit includes:
  determining, by the terminal device, a specific number of the time units according to the constraint condition starting from the first time unit.

In combination with the first aspect or any of the above possible implementations, in another possible implementation of the first aspect, the method further includes:
  receiving, by the terminal device, third configuration information sent by the network device, the third configuration information being used for indicating the specific number.

In combination with the first aspect or any of the above possible implementations, in another possible implementation of the first aspect, the method further includes:
  receiving, the terminal device, fourth configuration information sent by the network device, the fourth configuration information being used for indicating the terminal device to use the plurality of time units to transmit the one first channel.

In combination with the first aspect or any of the above possible implementations, in another possible implementation of the first aspect, the sending, by the terminal device, the one first channel to the network device on the plurality of time units includes:

transmitting, by the terminal device, the one first channel by using a same frequency domain resource in the plurality of time units; or transmitting, by the terminal device, the one first channel by using a first frequency domain resource in a first time unit of the plurality of time units and using a second frequency domain resource in a time unit other than the first time unit in the plurality of time units, wherein the second frequency domain resource is determined based on the first frequency domain resource.

In combination with the first aspect or any of the above possible implementations, in another possible implementation of the first aspect, the time unit is a time slot, a subframe or a frame.

According to a second aspect, there is provided a wireless communication method, including:

determining, by a network device, a plurality of time units according to a constraint condition starting from a first time unit, the plurality of time units being used for transmitting one first channel; and receiving, by the network device, the one first channel sent by a terminal device on the plurality of time units.

In combination with the second aspect, in a possible implementation of the second aspect, the constraint condition is a constraint on at least one of followings of the time unit: a physical resource available for transmitting the one first channel within the time unit, or a channel transmitted by the terminal device in the time unit other than the one first channel.

In combination with the second aspect or any of the above possible implementations, in another possible implementation of the second aspect, the constraint on the physical resource available for transmitting the one first channel within the time unit includes: a constraint on the number of the physical resource available for transmitting the one first channel within the time unit.

In combination with the second aspect or any of the above possible implementations, in another possible implementation of the second aspect, the number of a physical resource available for transmitting the one first channel in each of the time units satisfying the constraint condition is greater than or equal to a predetermined value.

In combination with the second aspect or any of the above possible implementations, in another possible implementation of the second aspect, the method includes:

the number of time domain symbols available for transmitting the one first channel within each of the time units satisfying the constraint condition being greater than or equal to a first predetermined value; or the number of time domain symbols available for transmitting the one first channel within each of the time units satisfying the constraint condition being greater than or equal to a first predetermined value, and the number of frequency domain resources available for transmitting the one first channel being greater than or equal to a second predetermined value; or the number of a first channel unit available for transmission within each of the time units satisfying the constraint condition being greater than or equal to a third predetermined value.

In combination with the second aspect or any of the above possible implementations, in another possible implementation of the second aspect, the first channel unit includes a reference signal and includes control and/or data information.

In combination with the second aspect or any of the above possible implementations, in another possible implementation of the second aspect, the method further includes:

sending, by the network device, first configuration information to the terminal device, the first configuration information being used to configure the first channel unit.

In combination with the second aspect or any of the above possible implementations, in another possible implementation of the second aspect, the method further includes:

sending, by the network device, second configuration information to the terminal device, the second configuration information being used for indicating the predetermined value.

In combination with the second aspect or any of the above possible implementations, in another possible implementation of the second aspect, the constraint on the channel transmitted by the terminal device in the time unit other than the one first channel includes: a constraint on the channel transmitted by the terminal device in the unit other than the one first channel with respect to a priority of the one first channel.

In combination with the second aspect or any of the above possible implementations, in another possible implementation of the second aspect, the channel transmitted by the terminal device in the time unit satisfying the constraint condition other than the first channel has a lower priority than that of the one first channel.

In combination with the second aspect or any of the above possible implementations, in another possible implementation of the second aspect, the determining, by the network device, a plurality of time units according to the constraint condition starting from the first time unit includes:

determining, by the network device, a specific number of the time units according to the constraint condition starting from the first time unit.

In combination with the second aspect or any of the above possible implementations, in another possible implementation of the second aspect, the method further includes:

sending, by the network device, third configuration information to the terminal device, the third configuration information being used for indicating the specific number.

In combination with the second aspect or any of the above possible implementations, in another possible implementation of the second aspect, the method further includes:

sending, by the network device, fourth configuration information to the terminal device, the fourth configuration information being used for indicating the terminal device to transmit the one first channel by using the plurality of time units.

In combination with the second aspect or any of the above possible implementations, in another possible implementation of the second aspect, the receiving, by the network device, the one first channel sent by a terminal device on the plurality of time units includes:

receiving, by the network device, the first channel using a same frequency domain resource in the plurality of time units; or receiving, by the network device, the one first channel by using a first frequency domain resource in a first time unit of the plurality of time units and using a second frequency domain resource in a time unit other than the first time unit in the plurality of time units, wherein the second frequency domain resource is determined based on the first frequency domain resource.

In combination with the second aspect or any of the above possible implementations, in another possible implementation of the second aspect, the method further includes: the time unit is a time slot, a subframe or a frame.

According to a third aspect, there is provided a terminal device for performing the method in the above first aspect or any of the possible implementations of the first aspect. In particular, the terminal device includes functional modules for performing the method in the above first aspect or any of the possible implementations of the first aspect.

According to a fourth aspect, there is provided a network device for performing the method in the above second aspect or any of the possible implementations of the second aspect. In particular, the network device includes functional modules for performing the method in the above second aspect or any of the possible implementations of the second aspect.

According to a fifth aspect, there is provided a terminal device, including a processor, a memory and a transceiver. The processor, the memory and the transceiver are communicated with each other through an internal connection line to transmit control and/or data signals, so that the terminal device performs the method in the above first aspect or any of the possible implementations of the first aspect.

According to a sixth aspect, there is provided a network device, including a processor, a memory and a transceiver. The processor, the memory and the transceiver are communicated with each other through an internal connection line to transmit control and/or data signals, so that the network device performs the method in the above second aspect or any of the possible implementations of the second aspect.

According to a seventh aspect, there is provided a computer readable medium for storing computer programs, which include instructions for executing the above first aspect or any possible implementation of the first aspect.

According to an eighth aspect, there is provided a computer readable medium for storing computer programs, which include instructions for executing the above second aspect or any possible implementation of the second aspect.

According to a ninth aspect, there is provided a computer program product including instructions, the computer program product, when being running on a computer, enables the computer to execute the method in the above first aspect or any possible implementation of the first aspect, or the above second aspect or any possible implementation of the second aspect.

Therefore, in the implementation of the present disclosure, the terminal device determines a plurality of time units according to a constraint condition starting from a first time unit, the plurality of time units being used for transmitting one first channel; and the terminal device sends the one first channel to the network device on the plurality of time units. In this way, the time unit can be dynamically selected to avoid performing channel transmission in a fixed time unit, and the present disclosure can be applied to a scenario in which time domain resources occupied by the channel are different in size, thereby the flexibility of channel transmission can be enhanced. Further, when the transmission power of the terminal device is limited, a plurality of time units may be selected to transmit one channel.

BRIEF DESCRIPTION OF THE DRAWINGS

In order to illustrate the technical solutions of the implementation of the present disclosure more clearly, the drawings used in the description of the implementation or the related art will be briefly described below. Obviously, the drawings in the following description merely involve some implementation of the present disclosure. For those of ordinary skills in the art, other drawings may also be obtained based on these drawings without going through any creative effort.

DETAILED DESCRIPTION

The following clearly and completely describes the technical solutions in the implementation of the present disclosure with reference to the accompanying drawings in the implementation of the present disclosure. Apparently, the described implementations are merely some but not all of the implementations of the present disclosure. Based on the implementation of the present disclosure, all other implementations obtained by those of ordinary skills in the art without going through any creative effort shall fall within the scope of protection of the present disclosure.

The technical solutions of the implementation of the present disclosure may be applied to various communication systems, for example, a Global System of Mobile communication ("GSM"), a Code Division Multiple Access (CDMA) system, a Wideband Code Division Multiple Access (WCDMA) system, General Packet Radio Service ("GPRS"), a Long Term Evolution ("LTE") system, a LTE Frequency Division Duplex ("FDD") system, LTE Time Division Duplex ("TDD"), a Universal Mobile Telecommunication System ("UMTS"), a Worldwide Interoperability for Microwave Access ("WiMAX") communication system, or a future 5G system (also known as a New Radio (NR) system), and the like.

Figure 1:
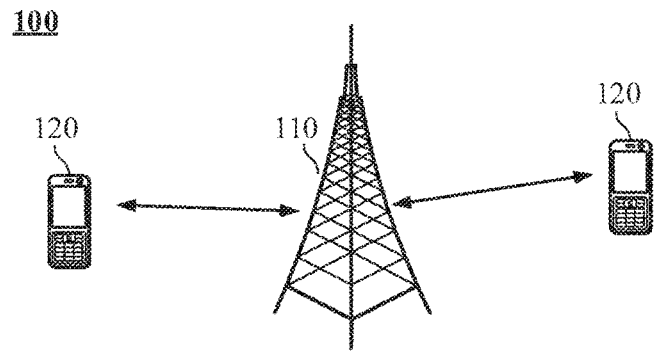
FIG. 1 is a schematic diagram of a wireless communication system according to an implementation of the present disclosure.

FIG. 1 shows a wireless communication system 100 to which an implementation of the present disclosure is applied. The wireless communication system 100 may include a network device 110. The network device 110 may be a device that communicates with a terminal device. The network device 110 may provide communication coverage for a particular geographic area and may communicate with the terminal device (e.g., UE) located within the coverage area. In at least one implementation, the network device 110 may be a base station (Base Transceiver Station, BTS) in the GSM system or the CDMA system, or may be a base station (NodeB, NB) in the WCDMA system, or may be an evolved base station (Evolutional Node B, eNB or eNodeB) in the LTE system, or a wireless controller in a Cloud Radio Access Network (CRAN), or the network device may be a relay station, an access point, an in-vehicle device, a wearable device, a network side device in a future 5G network or a network device in a Public Land Mobile Network (PLMN) in the future.

The wireless communication system 100 also includes at least one terminal device 120 located within the coverage of the network device 110. The terminal device 120 may be mobile or fixed. In at least one implementation, the terminal device 120 may refer to an access terminal, a User Equipment (UE), a subscriber unit, a subscriber station, a mobile station, a mobile stage, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with wireless communication function, a computing device or other processing devices connected to a wireless modem, an in-vehicle device, a wearable device, a terminal device in future 5G network, or a terminal device in future evolved PLMN, and the like.

In at least one implementation, Device to Device (D2D) communication may be performed between the terminal devices 120.

In at least one implementation, the 5G system or network may also be referred to as a New Radio (NR) system or network.

FIG. 1 exemplarily shows one network device and two terminal devices. In at least one implementation, the wireless communication system 100 may include a plurality of network devices and may include other numbers of terminal devices within the coverage of each network device, which is not limited by the implementation of the present disclosure.

In at least one implementation, the wireless communication system 100 may further include other network entities, such as a network controller, a mobility management entity, and the like, which is not limited by the implementation of the present disclosure.

It should be understood that the terms "system" and "network" are used interchangeably herein. The term "and/or" in the present disclosure is merely used for describing an association between the associated objects, indicating that there may be three relationships, for example, A and/or B may indicate three situations: A exists separately, both A and B exist at the same time, and B exists separately. In addition, the character "/" in the present disclosure generally indicates that the contextual objects has an "or" relationship.

Figure 2:
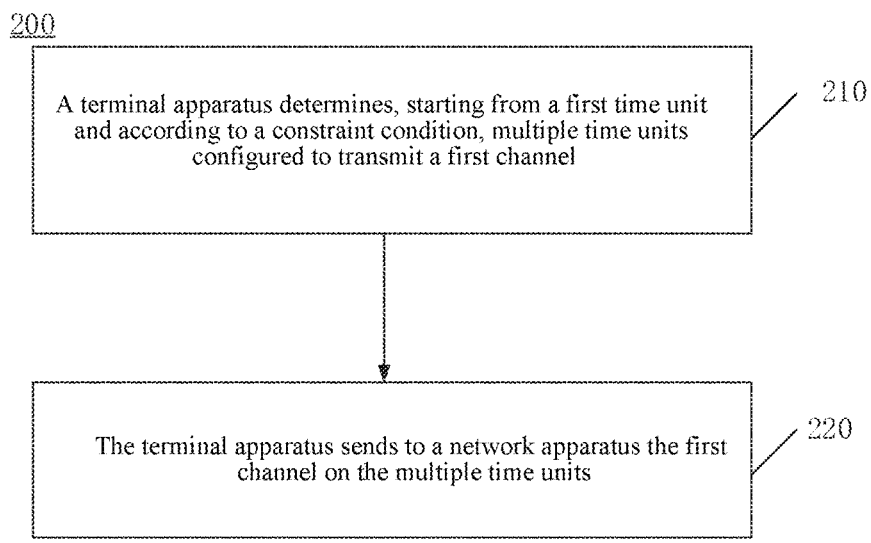
FIG. 2 is a schematic flowchart of a wireless communication method according to an implementation of the present disclosure.

FIG. 2 is a schematic flowchart of a wireless communication method 200 according to an implementation of the present disclosure. In at least one implementation, the method 200 is applicable to the system shown in FIG. 1, but is not limited thereto. As shown in FIG. 2, the method 200 includes at least some of the following.

In 210, the terminal device determines a plurality of time units according to a constraint condition starting from a first time unit, the plurality of time units being used for transmitting one first channel.

Specifically, the terminal device may determine, from a specific time unit, a plurality of time units that satisfy the constraint condition for transmitting one channel.

In at least one implementation, the first channel may be an uplink control channel, for example, an Uplink Physical Control Channel (PUCCH), or an uplink data channel, such as an Uplink Physical Shared Channel (PUSCH).

In at least one implementation, the time unit mentioned in the implementation of the present disclosure may be a time slot, a subframe, a frame, or the like.

In at least one implementation, the determining the plurality of time units for transmitting the first channel from the first time unit may be performed when the first time unit satisfies the constraint condition, or the first time unit may be selected, or no judgment is performed on the first time unit and the judgment is started from the next time unit of the first time unit.

In at least one implementation, which time unit being used as the first time unit may be configured by the network device or may be pre-configured.

In at least one implementation, the terminal device may determine the first time unit according to the current service transmission condition, for example, a time unit that has a predetermined time unit from the last data transmission is determined as the first time unit.

In at least one implementation, the constraint condition mentioned in the implementation of the present disclosure is used for indicating a constraint on a time unit used for transmitting the first channel, and when a certain time unit satisfies the constraint condition, this time unit may be selected to transmit the first channel.

In at least one implementation, the constraint is a constraint on at least one of the followings of the time units: a physical resource available for transmitting the one first channel within the time unit, or a channel transmitted in the time unit other than the one first channel.

Specifically, when a physical resource that may be used for transmitting one first channel and/or a channel for transmission that is not the first channel in a certain time meets the constraint condition, the time unit may be selected to transmit the first channel.

In at least one implementation, the constraint on the physical resources available for transmitting the one first channel within the time unit may include a constraint on the number of the physical resource(s) available for transmitting the one first channel within the time unit.

The number of the physical resource(s) may refer to a time domain resource that may be used for transmitting the first channel, a frequency domain resource that transmits the first channel, and/or a first channel unit.

In at least one implementation, the time domain resource may be the number of time domain symbols or the like.

In at least one implementation, the frequency domain resource may be the number of sub-bands, a bandwidth, or the like.

In at least one implementation, the first channel unit may be a minimum unit that may be used for transmitting the first channel. For example, when the first channel is a PUSCH, the first channel unit may be a Physical Resource Block (PRB).

In at least one implementation, the information transmitted by the first channel unit may be independently encoded and decoded.

In at least one implementation, the first channel unit may include a reference signal and include control and/or data information.

In at least one implementation, the network device may configure the first channel unit, for example, may configure the number of the first channel unit(s) available for transmission in each time unit, or configure the size of the first channel unit, or configure the location of the first channel unit in the time unit, or configure the location for transmitting the reference signal, control and/or data information in the channel unit.

In at least one implementation, in the implementation of the present disclosure, the number of the physical resource (s) available for transmitting the first channel in each of the time units that meet the constraint condition is greater than or equal to a predetermined value.

In one implementation, the number of time domain symbol(s) available for transmitting the one first channel in each of the time units satisfying the constraint condition is greater than or equal to a first predetermined value, and in at least one implementation, the first predetermined value is a positive integer.

Figure 3:
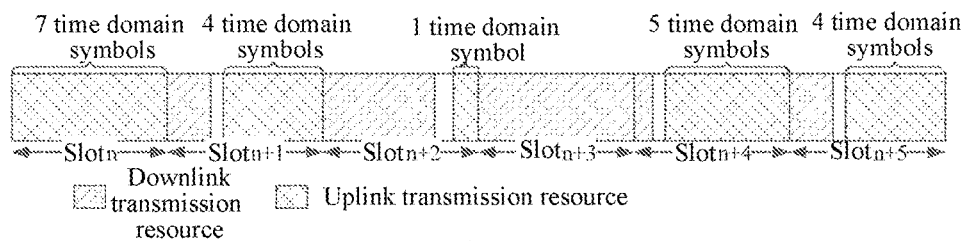
FIG. 3 is a schematic diagram of time domain resource allocation according to an implementation of the present disclosure.

For example, it is assumed that the first channel is an uplink control channel, and the constraint condition is that the number of uplink time domain symbols included in the time unit is not less than 4, then the uplink control channel occupies N=4 time slots for transmission. As shown in FIG. 3, the terminal uses time slots n, n+1, n+4, and n+5 to perform time slot aggregation to transmit the uplink control channel.

In an implementation, the number of time domain symbols available for transmitting the one first channel within each of the time units satisfying the constraint condition is greater than or equal to the first predetermined value, and the number of frequency domain resources available for transmitting the one first channel is greater than or equal to a second predetermined value, and in at least one implementation, the first predetermined value and the second predetermined value may be positive integers.

In an implementation, the number of the first channel unit available for transmission within each of the time units satisfying the constraint condition is greater than or equal to a third predetermined value, and in at least one implementation, the third predetermined value may be a positive integer.

Figure 4:
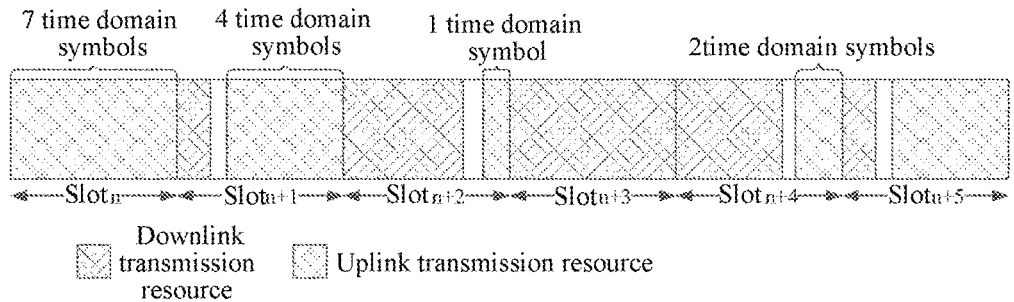
FIG. 4 is a schematic diagram of time domain resource allocation according to an implementation of the present disclosure.

For example, assuming that the first channel is an uplink control channel, the constraint is that at least one first channel unit may be transmitted in a time unit, the first channel unit includes two time domain symbols, and the uplink control channel occupies N=4 time slots for transmission. As shown in FIG. 4, the terminal uses time slots n, n+1, n+4, and n+5 to perform time slot aggregation to transmit the uplink control channel.

In at least one implementation, the number of the first channel unit being greater than or equal to the third predetermined value means that the number of the first channel unit included in the selected time unit is greater than or equal to the third predetermined value, and the number of the channel unit included in the selected time unit may not be a positive integer.

In at least one implementation, the network device may configure the predetermined value of the number of the physical resource, for example, the network device may configure the first predetermined value, the second predetermined value, or the third predetermined value.

It should be understood that, in the implementation of the present disclosure, the constraint on the physical resource that may be used for transmitting one first channel in the time unit may further include a constraint independent of number, for example, a constraint on a resource location of the physical resource. In this case, due to the constraint on the resource location of the physical resource, interference between channel transmissions can be avoided.

In at least one implementation, the constraint on the channel transmitted in the time unit that is not in the first channel includes: a constraint on a priority of the channel transmitted in the time unit other than the one first channel with respect to the one first channel.

In at least one implementation, the channel transmitted in the time unit satisfying the constraint condition other than the one first channel has a lower priority than that of the one first channel.

Figure 5:
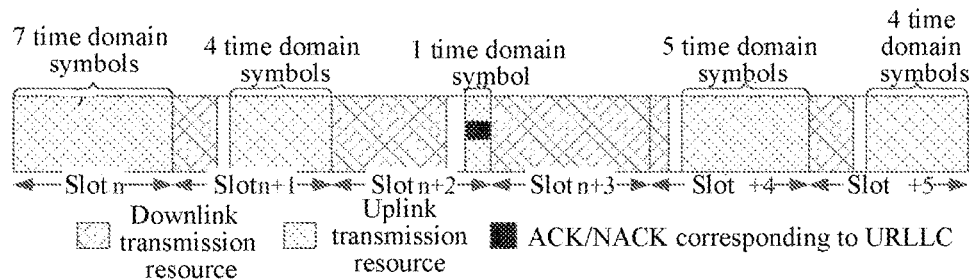
FIG. 5 is a schematic diagram of time domain resource allocation according to an implementation of the present disclosure.

For example, it is assumed that the first channel is an uplink control channel, and the uplink control channel is used for transmitting ACK/NACK information corresponding to an Enhanced Mobile Broadband (eMBB) service. The system specifies that the uplink control channel for transmitting the Acknowledge/Non-Acknowledge (ACK/NACK) information corresponding to an Ultra-reliable and low latency communications (URLLC) service has a higher priority than the first channel, the constraint condition is that there is no other higher priority channel transmission in the time unit, and the first channel occupies N=4 time slots for transmission. As shown in FIG. 5, the terminal device performs time slot aggregation using time slots n, n+1, n+4, and n+5 to transmit the uplink control channel.

In at least one implementation, the prioritization between channels may be variable, for example, may vary as the service transmission situation.

In at least one implementation, the prioritization between the channels may be determined by the terminal device according to the current service transmission situation, or may be configured by the network device.

In at least one implementation, the constraint on the channel that is not the one first channel transmitted in the time unit may further include a constraint on a type of the channel that is not the one first channel transmitted in the time unit and/or a constraint on the number of channels.

For example, the time unit for transmitting the one first channel is constrained to include a certain type of channel or cannot include a certain type of channel.

For example, the number of other channels transmitted by the time unit for transmitting the one first channel is constrained to be not greater than a certain number.

In at least one implementation, the constraint condition mentioned in the implementation of the present disclosure may simultaneously constrain the physical resources in the time unit that are used for transmitting the one first channel and the channels that are transmitted in the time unit rather than the one first channel.

Figure 6:
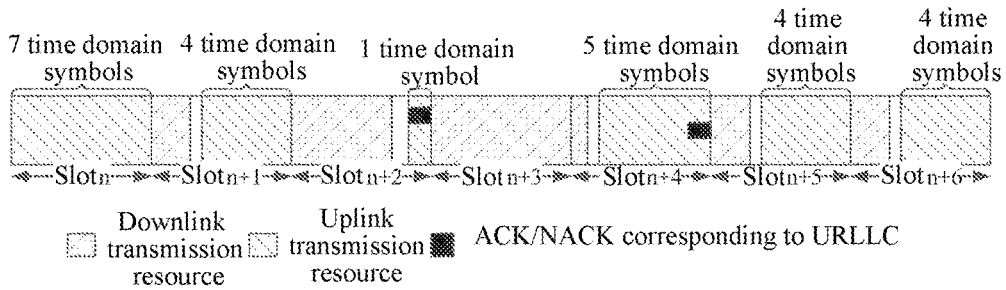
FIG. 6 is a schematic diagram of time domain resource allocation according to an implementation of the present disclosure.

For example, the first channel is an uplink control channel, and the uplink control channel is used for transmitting ACK/NACK information corresponding to the eMBB service. The system specifies that the priority of the second type uplink control channel for transmitting the ACK/NACK information corresponding to the URLLC service is higher than the first channel, the constraint condition is that the number of uplink time domain symbols included in the time unit is not less than 4 and no other higher priority channel transmission is performed in the time unit, and the uplink control channel occupies N=4 time slots for transmission. As shown in FIG. 6, the terminal device performs time slot aggregation using time slots n, n+1, n+5, and n+6 to transmit the first channel.

In at least one implementation, the terminal device may determine a specific number of the time units according to the constraint condition starting from the first time unit.

In at least one implementation, the specific number may be configured by the network device or may be pre-configured.

In at least one implementation, the specific number may be related to a type of the channel to be transmitted. For example, the number of time units selected when the channel to be transmitted is the PUSCH is different from the number of time units selected when the channel to be transmitted is the PUCCH.

In at least one implementation, the specific number may be related to the amount of information carried in the channel to be transmitted. For example, when the amount of information carried by the channel to be transmitted is large, the number of selected time units may also be large.

In at least one implementation, the terminal device may not specifically limit the number of the selected time units when selecting the time unit.

For example, starting from the first time unit, a sum of the number of channel units included in the selected time unit should be greater than a predetermined value.

In at least one implementation, in the implementation of the present disclosure, the network device may configure the terminal device to configure whether to use a plurality of time units to transmit a certain channel.

In at least one implementation, the terminal device may further determine whether to transmit one first channel by using a plurality of time units according to current service transmission situation.

In at least one implementation, the manner of transmitting one channel using a plurality of time units in the implementation of the present disclosure may be referred to as transmitting one channel by using time unit aggregation, for example, one channel is transmitted by the slot aggregation manner, or one channel is transmitted by a subframe aggregation manner.

In 220, the terminal device sends the one first channel to the network device on the plurality of time units.

In at least one implementation, the terminal device transmits the one first channel by using the same frequency domain resource in the plurality of time units.

In at least one implementation, the terminal device transmits the one first channel by using a first frequency domain resource in a first time unit of the plurality of time units and using a second frequency domain resource in a time unit other than the first time unit in the plurality of time units, where the second frequency domain resource is determined based on the first frequency domain resource.

For example, the first frequency domain resource may be used for the first time unit in the determined plurality of time units, and the frequency domain resource for each subsequent time unit may be selected by adding a predetermined offset value sequentially.

In at least one implementation, the first frequency domain resource may be used for the first time unit in the determined plurality of time units, and the frequency domain resource for each subsequent time unit may be selected according to a specific hopping manner.

In at least one implementation, in the implementation of the present disclosure, one channel may include information included in one transmission, the one transmission may include source coding, channel coding, rate matching, and sending after modulation and mapping at the sending end, and correspondingly, may include a demodulation and mapping, a de-rate matching, a channel decoding, and a source decoding and outputting sink at the receiving end.

In at least one implementation, in the implementation of the present disclosure, sending one first channel on the plurality of time units may refer to sending information of different parts of the first channel in each time unit.

In at least one implementation, sending the one first channel on the plurality of time units may be repeatedly sending the first channel. The repeatedly sent first channel may undergo one coding, rate matching, and modulation and mapping or a plurality of coding, rate matching, and modulation and mapping.

Figure 7:
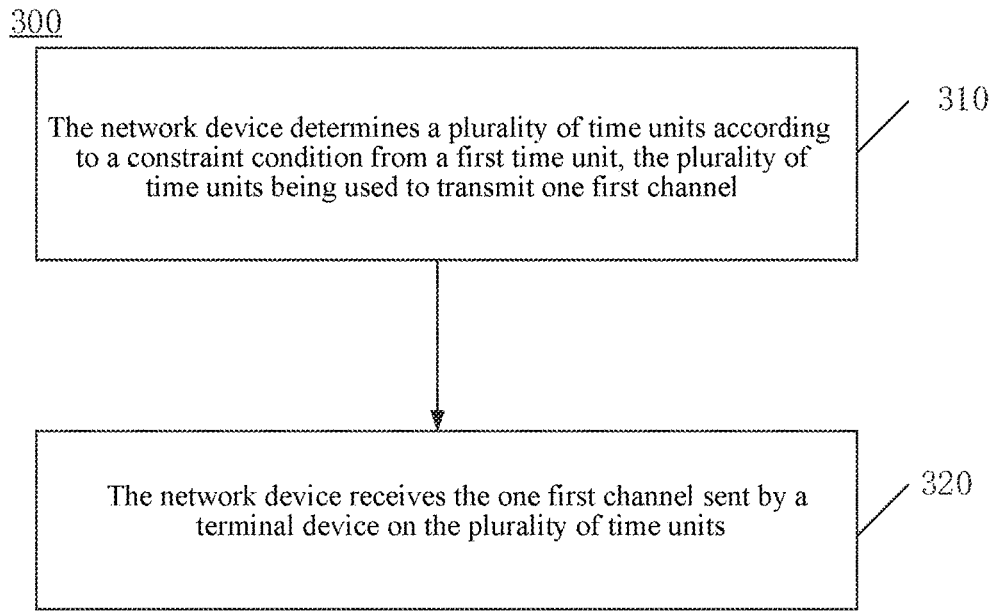
FIG. 7 is a schematic flowchart of a wireless communication method according to an implementation of the present disclosure.

FIG. 7 is a schematic flowchart of a wireless communication method 300 according to an implementation of the present disclosure. As shown in FIG. 7, the wireless communication method 300 includes at least part of the following.

In 310, the network device determines a plurality of time units according to a constraint condition starting from a first time unit, the plurality of time units being used for transmitting one first channel.

In at least one implementation, the constraint condition is a constraint on at least one of the followings of the time units: a physical resource available for transmitting the one first channel within the time unit, or a channel transmitted by the terminal device in the time unit other than the one first channel.

In at least one implementation, the constraint on the physical resource available for transmitting the one first channel within the time unit includes: a constraint on the number of the physical resource available for transmitting the one first channel within the time unit.

In at least one implementation, the number of physical resources available for transmitting the one first channel in each of the time units that satisfy the constraint is greater than or equal to a predetermined value.

In at least one implementation, the network device sends second configuration information to the terminal device, where the second configuration information is used for indicating the predetermined value.

In at least one implementation, the number of time domain symbols available for transmitting the one first channel within each of the time units satisfying the constraint condition is greater than or equal to a first predetermined value; or
the number of time domain symbols available for transmitting the one first channel within each of the time units satisfying the constraint condition is greater than or equal to a first predetermined value, and the number of frequency domain resources available for transmitting the one first channel is greater than or equal to a second predetermined value; or
the number of a first channel unit available for transmission within each of the time units satisfying the constraint condition is greater than or equal to a third predetermined value.

In at least one implementation, the first channel unit includes a reference signal and includes control and/or data information.

In at least one implementation, the network device sends first configuration information to the terminal device, where the first configuration information is used to configure the first channel unit.

In at least one implementation, the constraint on the channel transmitted by the terminal device in the time unit other than the one first channel includes: a constraint on a priority of the channel transmitted by the terminal device in the time unit other than the one first channel with respect to the one first channel.

In at least one implementation, the channel transmitted by the terminal device in the time unit satisfying the constraint condition other than the first channel has a lower priority than that of the one first channel.

In at least one implementation, the network device determines a specific number of the time units according to the constraint condition starting from the first time unit.

In at least one implementation, the network device sends third configuration information to the terminal device, where the third configuration information is used for indicating the specific number.

In at least one implementation, the network device sends the fourth configuration information to the terminal device, where the fourth configuration information is used for indicating the terminal device to use the plurality of time units to transmit the one first channel.

In 320, the network device receives the one first channel sent by the terminal device on the plurality of time units.

In at least one implementation, the network device receives the first channel by using the same frequency domain resource in the plurality of time units; or the network device receives the one first channel by using a first frequency domain resource in a first time unit of the plurality of time units and using a second frequency domain resource in a time unit other than the first time unit in the plurality of time units, wherein the second frequency domain resource is determined based on the first frequency domain resource.

In at least one implementation, the time unit is a time slot, a subframe or a frame.

It should be understood that the features of the method 300 and method 200 may be used in combination.

Therefore, in the implementation of the present disclosure, the terminal device determines a plurality of time units according to a constraint condition starting from a first time unit, the plurality of time units being used for transmitting one first channel; and the terminal device sends the one first channel to the network device on the plurality of time units. In this way, the time unit can be dynamically selected to avoid performing channel transmission in a fixed time unit, and the present disclosure can be applied to a scenario in which time domain resources occupied by the channel are different in size, thereby the flexibility of channel transmission can be enhanced.

For example, it may be applicable to a scenario including a long PUCCH which may include 1 or 2 time domain symbols, and a short PUCCH which may include 4-14 time domain symbols.

Further, when the transmission power of the terminal device is limited, a plurality of time units may be selected to transmit one channel.

For example, when the transmission power of the terminal device is limited, a plurality of time slots may be selected to transmit the same uplink control channel.

Figure 8:
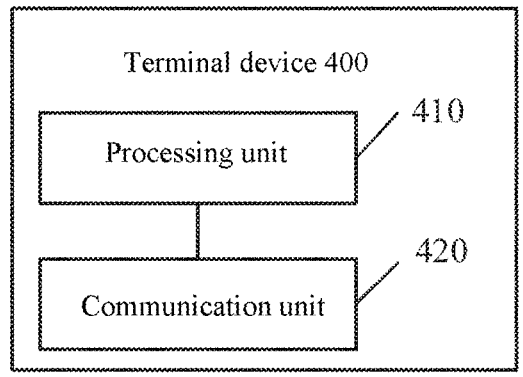
FIG. 8 is a schematic block diagram of a terminal device according to an implementation of the present disclosure.

FIG. 8 is a schematic block diagram of a terminal device 400 according to an implementation of the present disclosure. As shown in FIG. 8, the terminal device includes a processing unit 410 and a communication unit 420.

The processing unit 410 is configured to determine a plurality of time units according to a constraint condition starting from a first time unit, the plurality of time units being used for transmitting one first channel.

The communication unit 420 is configured to send the one first channel to the network device on the plurality of time units.

In at least one implementation, the terminal device 400 may be used in various operations implemented by the terminal device in the method 200. For brevity, details are not described herein again.

Figure 9:
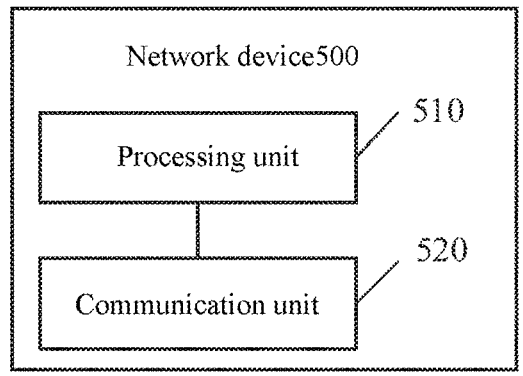
FIG. 9 is a schematic block diagram of a network device according to an implementation of the present disclosure.

FIG. 9 is a schematic block diagram of a network device 500 according to an implementation of the present disclosure. As shown in FIG. 9, the network device includes a processing unit 510 and a communication unit 520.

The processing unit 510 is configured to determine a plurality of time units according to a constraint condition starting from a first time unit, the plurality of time units being used for transmitting one first channel.

The communication unit 520 is configured to receive the one first channel sent by a terminal device on the plurality of time units.

In at least one implementation, the network device 500 may be used in various operations implemented by the network device in the method 300. For brevity, details are not described herein again.

Figure 10:
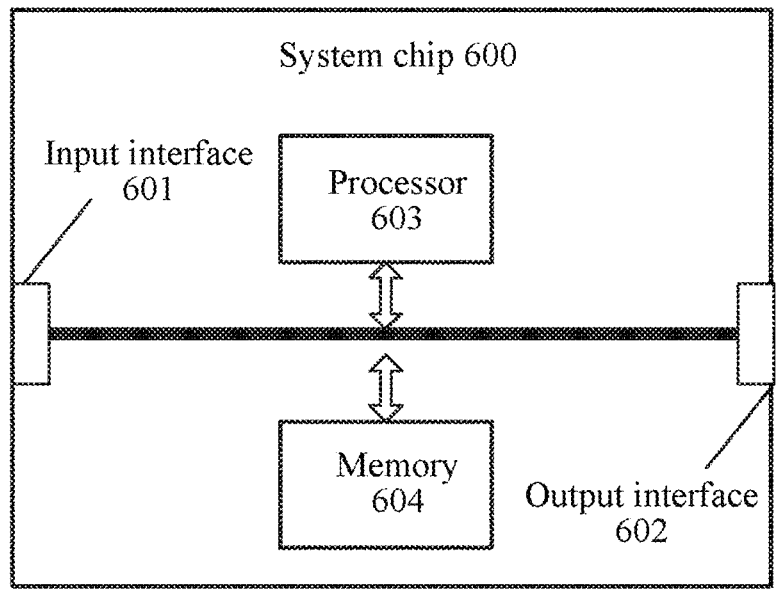
FIG. 10 is a schematic block diagram of a system chip according to an implementation of the present disclosure.

FIG. 10 is a schematic structural diagram of a system chip 600 according to an implementation of the present disclosure. The system chip 600 of FIG. 10 includes an input interface 601, an output interface 602, the processor 603, and a memory 604 that may be connected by an internal communication connection line, and the processor 603 is configured to execute codes in the memory 504.

In at least one implementation, when the codes are executed, the processor 603 implements the method performed by the network device in the method implementation. For the sake of brevity, it will not be repeated here.

In at least one implementation, when the codes are executed, the processor 603 implements the method performed by the terminal device in the method implementation. For the sake of brevity, it will not be repeated here.

Figure 11:
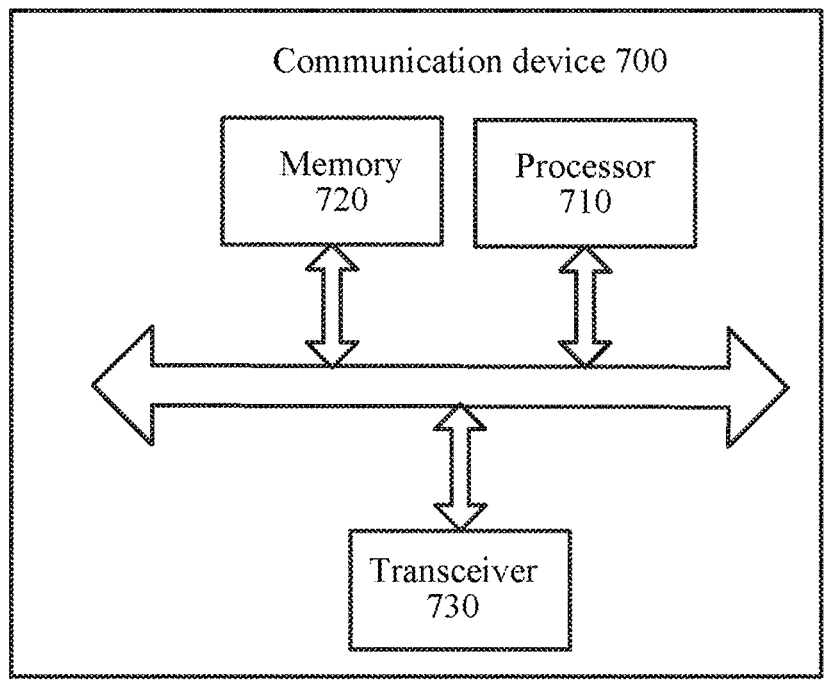
FIG. 11 is a schematic block diagram of a communication device according to an implementation of the present disclosure.

FIG. 11 is a schematic block diagram of a communication device 700 according to an implementation of the present disclosure. As shown in FIG. 11, the communication device 700 includes a processor 710 and a memory 720. The memory 720 may store program codes, and the processor 710 may execute the program codes stored in the memory 720.

In at least one implementation, as shown in FIG. 11, the communication device 700 may include a transceiver 730, and the processor 710 may control the transceiver 730 to communicate externally.

In at least one implementation, the processor 710 may call the program codes stored in the memory 720 to perform the corresponding operations of the network device in the method implementation. For brevity, details are not described herein again.

In at least one implementation, the processor 710 may call the program codes stored in the memory 720 to perform the corresponding operations of the terminal device in the method implementation. For brevity, details are not described herein again.

It should be understood that the processor in the implementation of the present disclosure may be an integrated circuit chip and has a signal processing capability. In an implementation process, the steps in the foregoing method implementation may be completed using an integrated logic circuit of hardware or an instruction in a form of software in the processor. The above processor may be a general purpose processor, a Digital Signal Processor (DSP), an Application Specific Integrated Circuit (ASIC), a Field Programmable Gate Array (FPGA) or other programmable logic device, a discrete gate, or a transistor logic device, and a discrete hardware assembly, which may implement or execute the methods, steps, and logic diagrams disclosed in the implementation of the present disclosure. The general purpose processor may be a microprocessor or the processor may be any conventional processor, or the like. The steps of the methods disclosed with reference to the implementation of the present disclosure may be directly executed and accomplished by means of a hardware decoding processor or may be executed and accomplished using a combination of hardware and software modules in the decoding processor. The software module may be located in a mature storage medium in the art, such as a random access memory, a flash memory, a read-only memory, a programmable read-only memory, an electrically erasable programmable memory or a register. The storage medium is located in the memory. The processor reads information from the memory and completes the steps of the foregoing methods in combination with the hardware of the processor.

It may be understood that the memory in the implementation of the present disclosure may be a volatile memory or a non-volatile memory, or may include both volatile and non-volatile memories. The non-volatile memory may be a Read-Only Memory (ROM), a Programmable Read-Only Memory (PROM), an Erasable PROM (EPROM), an Electrically EPROM (EEPROM), or a flash memory. The volatile memory may be a Random Access Memory (RAM) that acts as an external high speed cache. By way of illustration and not limitation, RAM in many forms is available such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It should be noted that the memories of the systems and methods described herein are intended to include but not limited to these and any other suitable types of memories.

Those of ordinary skills in the art may be aware that, the units and algorithm steps of individual examples described in combination with the implementation disclosed herein, may be implemented by electronic hardware or a combination of computer software and the electronic hardware. Whether the functions are performed by hardware or software depends on particular applications and design constraint conditions of the technical solutions. Those of ordinary skills in the art may use different methods to implement the described functions for each particular application, but it should not be considered that the implementation goes beyond the scope of the present application.

It may be clearly understood by those of ordinary skills in the art that, for the purpose of convenient and brief description, for a detailed working process of the foregoing systems, devices, and units, reference may be made to a corresponding process in the foregoing method implementation, and details are not described herein again.

In the several implementation provided in the present disclosure, it should be understood that the disclosed systems, devices and methods may be implemented in other ways. For example, the device implementation described above are merely illustrative. For example, the division of the units is only one kind of logical function division. In practice, there may be other division manner. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, they may be located in one place, or may be distributed on multiple network units. Some or all of the units may be selected according to actual needs to achieve the objectives of the solutions in the implementation.

In addition, each functional unit in each implementation of the present disclosure may be integrated in one processing unit, or each unit may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the related art or a part of the technical solutions, may be embodied in the form of a software product. The computer software product is stored in a storage medium including the number of instructions such that a computer device (which may be a personal computer, a server, or a network device, etc.) performs all or a part of steps of the method described in each of the implementation of the present disclosure. The foregoing storage medium includes: any medium that is capable of storing program codes such as a USB disk, a mobile hard disk, a Read-Only Memory (ROM), a Random Access Memory (RAM), a magnetic disk, or an optical disk.

The foregoing descriptions are merely detailed implementation of the present disclosure, and the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be subjected to the protection scope of the claims.

What is claimed is:

1. A wireless communication method, comprising:
    determining, by a terminal device, a plurality of time units starting from a first time unit, wherein the plurality of time units are used for transmitting a first channel, and a number of time domain symbols available for transmitting the first channel in each of the plurality of time units is greater than or equal to a predetermined value;
    wherein a location of a physical resource used for transmitting the first channel in each of the plurality of time units satisfies a constraint condition.

2. The method according to claim 1, wherein a number of the plurality of time units is configured by a network device.

3. The method according to claim 1, wherein the first time unit is determined according to a configuration sent by a network device.

4. The method according to claim 1, wherein the first channel is repeatedly transmitted in the plurality of time units.

5. The method according to claim 1, wherein:
    the first channel is transmitted by using a same frequency domain resource in each of the plurality of time units; or
    the first channel is transmitted by using a first frequency domain resource in a first one time unit of the plurality of time units, and the first channel is transmitted by using a second frequency domain resource in a time unit other than the first time unit in the plurality of time units, wherein the second frequency domain resource is determined based on the first frequency domain resource.

6. The method according to claim 1, wherein the time domain symbols available for transmitting the first channel comprise an uplink symbol.

7. The method according to claim 1, wherein the time unit is a slot, a subframe or a frame.

8. The method according to claim 1, wherein the first channel is a physical uplink control channel (PUCCH) or a physical uplink shared channel (PUSCH).

9. A terminal device, comprising:
a processor;
a memory; and
a transceiver,
wherein the processor, the memory and the transceiver are communicated with each other through an internal connection line, and the processor is configured to:
determine a plurality of time units starting from a first time unit, wherein the plurality of time units are used for transmitting a first channel, and a number of time domain symbols available for transmitting the first channel in each of the plurality of time units is greater than or equal to a predetermined value;
wherein a location of a physical resource used for transmitting the first channel in each of the plurality of time units satisfies a constraint condition.

10. The terminal device according to claim 9, wherein a number of the plurality of time units is configured by a network device.

11. The terminal device according to claim 9, wherein the first time unit is determined according to a configuration sent by a network device.

12. The terminal device according to claim 9, wherein the first channel is repeatedly transmitted in the plurality of time units.

13. The terminal device according to claim 9, wherein:
the first channel is transmitted by using a same frequency domain resource in each of the plurality of time units; or
the first channel is transmitted by using a first frequency domain resource in a first one time unit of the plurality of time units, and the first channel is transmitted by using a second frequency domain resource in a time unit other than the first time unit in the plurality of time units, wherein the second frequency domain resource is determined based on the first frequency domain resource.

14. The terminal device according to claim 9, wherein the time domain symbols available for transmitting the first channel comprise an uplink symbol.

15. The terminal device according to claim 9, wherein the time unit is a slot, a subframe or a frame.

16. The terminal device according to claim 9, wherein the first channel is a physical uplink control channel (PUCCH) or a physical uplink shared channel (PUSCH).

17. A network device, comprising:
a processor;
a memory; and
a transceiver,
wherein the processor, the memory and the transceiver are communicated with each other through an internal connection line, and the processor is configured to:
determine a plurality of time units starting from a first time unit, wherein the plurality of time units are used for transmitting a first channel, and a number of time domain symbols available for transmitting the first channel in each of the plurality of time units is greater than or equal to a predetermined value;
wherein a location of a physical resource used for transmitting the first channel in each of the plurality of time units satisfies a constraint condition.

18. The network device according to claim 17, wherein the first channel is repeatedly transmitted in the plurality of time units.

* * * * *